United States Patent
Romanik et al.

(10) Patent No.: US 9,846,948 B2
(45) Date of Patent: Dec. 19, 2017

(54) SYSTEMS, METHODS, AND DEVICES FOR IMAGE MATCHING AND OBJECT RECOGNITION IN IMAGES USING FEATURE POINT OPTIMIZATION

(71) Applicant: Ditto Labs, Inc., Cambridge, MA (US)

(72) Inventors: Philip B. Romanik, West Haven, CT (US); Neil Lawrence Mayle, Cambridge, MA (US)

(73) Assignee: DITTO LABS, INC., Cambridge, MA (US)

( * ) Notice: Subject to any disclaimer, the term of this patent is extended or adjusted under 35 U.S.C. 154(b) by 0 days.

(21) Appl. No.: 14/745,393

(22) Filed: Jun. 20, 2015

(65) Prior Publication Data

US 2016/0104042 A1    Apr. 14, 2016

Related U.S. Application Data

(60) Provisional application No. 62/022,651, filed on Jul. 9, 2014.

(51) Int. Cl.
| | |
|---|---|
| *G06K 9/00* | (2006.01) |
| *G06T 7/33* | (2017.01) |
| *G06K 9/32* | (2006.01) |
| *G06K 9/46* | (2006.01) |
| *G06K 9/62* | (2006.01) |

(52) U.S. Cl.
CPC ............ *G06T 7/33* (2017.01); *G06K 9/00288* (2013.01); *G06K 9/00993* (2013.01); *G06K 9/325* (2013.01); *G06K 9/4633* (2013.01); *G06K 9/4671* (2013.01); *G06K 9/6269* (2013.01); *G06T 2207/10024* (2013.01)

(58) Field of Classification Search
CPC ..................... G06K 9/4671; G06K 9/00288
See application file for complete search history.

(56) References Cited

U.S. PATENT DOCUMENTS

| | | | | |
|---|---|---|---|---|
| 2007/0248249 A1* | 10/2007 | Stoianov | ............ | G06K 9/00087 382/124 |
| 2014/0003709 A1* | 1/2014 | Ranganathan | ..... | G06K 9/00798 382/159 |
| 2014/0217178 A1* | 8/2014 | Zhou | ...................... | G06F 3/017 235/454 |
| 2014/0270411 A1* | 9/2014 | Shu | ...................... | G06K 9/6211 382/118 |

* cited by examiner

*Primary Examiner* — Oneal R Mistry
(74) *Attorney, Agent, or Firm* — Siritzky Law, PLLC

(57) ABSTRACT

An image matching technique locates feature points in a template image such as a logo and then does the same in a test image. Feature points of a template image are determined under various transformations and used to determine a set of composite feature points for each template image. The composite feature points are used to determine if the template image is present in a test image.

12 Claims, 16 Drawing Sheets

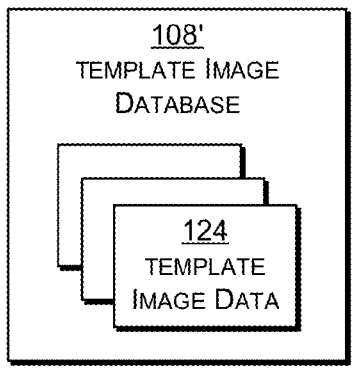
FIG. 2(A)
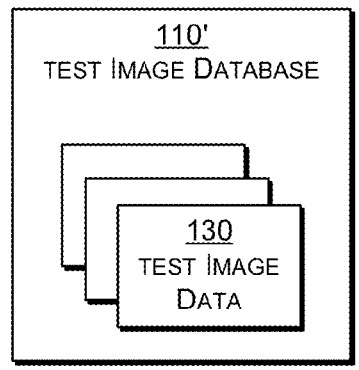
FIG. 2(C)
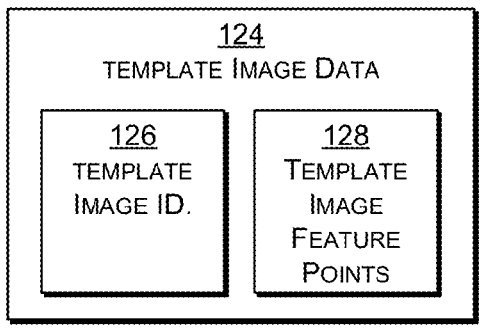
FIG. 2(B)
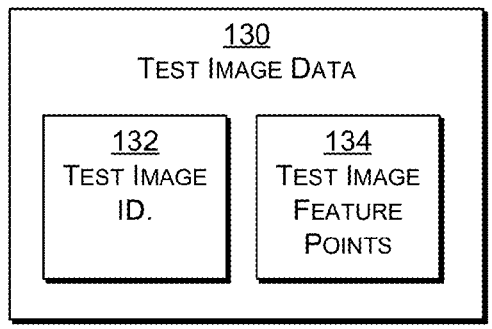
FIG. 2(D)
| IMAGE FEATURE POINTS | | |
|---|---|---|
| INDEX | LOCATION IN IMAGE (POSITION, SCALE, AND ROTATION) | DESCRIPTOR |
| 0 | $L_0$ | $D_0$ |
| 1 | $L_1$ | $D_1$ |
| . . . | . . . | . . . |
| K-1 | $L_{K-1}$ | $D_{K-1}$ |
FIG. 2(E)

| 136 MATCH IMAGE DATA | | |
|---|---|---|
| 138<br>TEST IMAGE ID. | 140<br>TEMPLATE ID. | 146<br>NUMBER OF FEATURE POINTS IN TEMPLATE |
| 148<br>MATCH SET | | |

| 148' MATCH SET | | |
|---|---|---|
| TEMPLATE POINT | TEST POINT | DISTANCE |
| P1 | P'1 | D1 |
| P2 | P'2 | D2 |
| . | . | . |
| . | . | . |
| . | . | . |
| P$_N$ | P'$_N$ | D$_N$ |

| Composite Feature Points ||
|---|---|
| Template Image | Composite Feature Points |
| TI1 | CFP1 |
| TI2 | CFP2 |
| ⋮ | ⋮ |
| TI*k* | CFP*k* |

FIG. 2(J)

SYSTEMS, METHODS, AND DEVICES FOR IMAGE MATCHING AND OBJECT RECOGNITION IN IMAGES USING FEATURE POINT OPTIMIZATION

RELATED APPLICATIONS

This application claims the benefit of U.S. Provisional Application No. 62/022,651, filed Jul. 9, 2014, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to image processing, and, more particularly, to enhanced techniques for image matching and object recognition in images.

BACKGROUND

Image processing techniques exist for trying to determine whether one image is present in another image. More specifically, techniques exist for trying to determine whether one or more objects in one image are present in another image. Such object recognition/identification/location techniques vary in speed and accuracy, but do not scale well to real time and on-the-fly processing of multiple images.

It is desirable to provide object recognition/identification/location image processing techniques that improve the speed and/or accuracy of such techniques. It is further desirable to provide image processing techniques for object recognition/identification/location that support and scale to accurate real-time, on-the-fly, and batch processing of multiple images.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2(a)-2(j) show aspects of databases and data structures used by the system of FIG. 1, according to exemplary embodiments hereof;

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

GLOH means Gradient Location and Orientation Histogram;

MSER means maximally stable external regions;

PCA-SIFT means Principal Components Analysis SIFT;

RANSAC refers to RANdom SAmple Consensus;

RBF means radial basis function;

SIFT means Scale-Invariant Feature Transform;

SURF means Speeded Up Robust Features;

SVM means support vector machine; and a "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Background & Overview

The process of matching features from a template image to a set of test images results in a subset of the test images that are considered candidate-matching images. Some of the candidate images are true positives and actually contain a (possibly transformed) version or a portion of the template image. Other candidate images are false positives and a person viewing them would be confident that they do not actually contain the template image, a transformed version of the template or even a portion from a transformed version of the template.

Figure 6A:
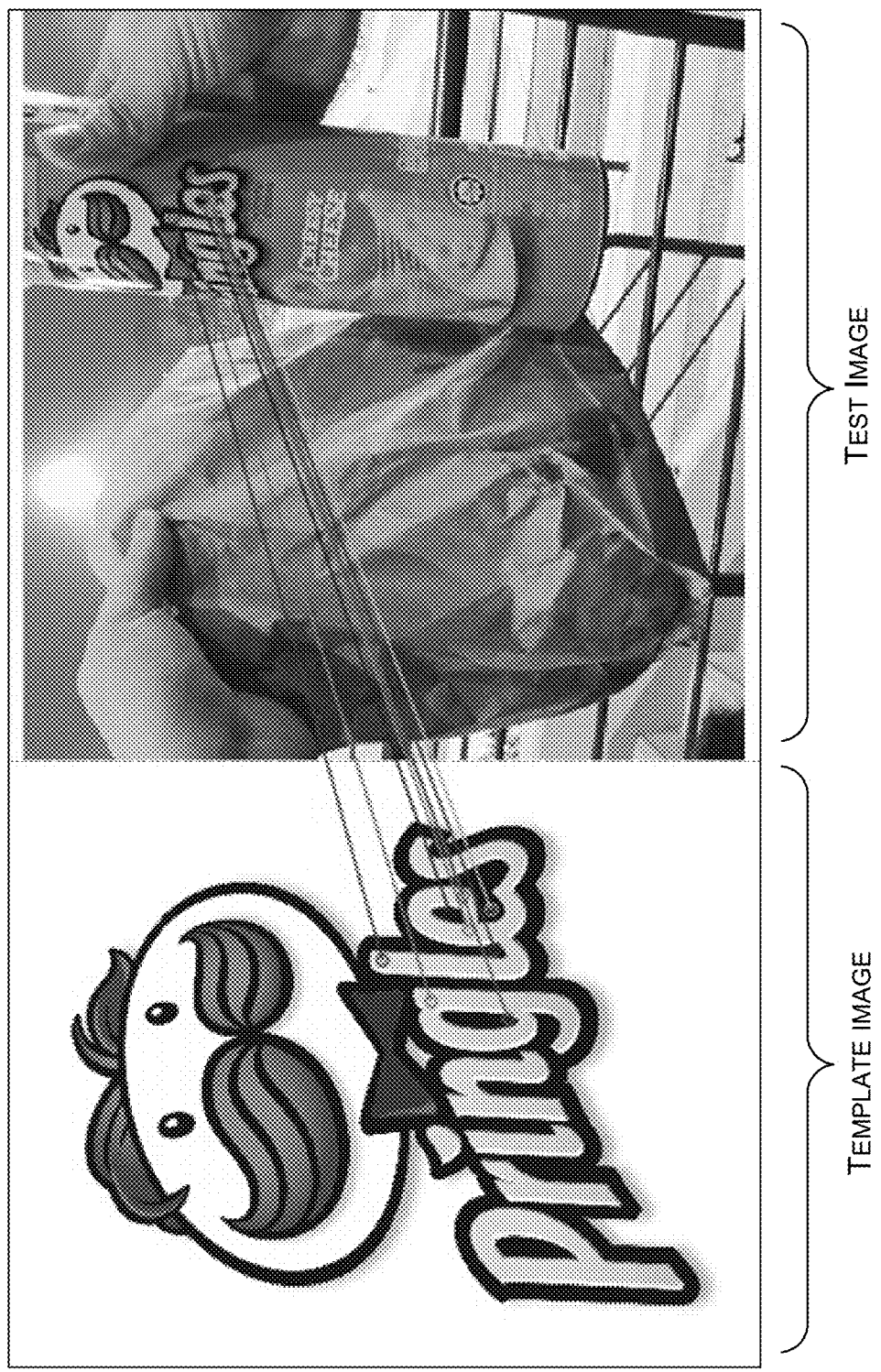
FIGS. 6(a)-6(d) show examples of the matching one or more portions of a template image to a test image.
Figure 6B:
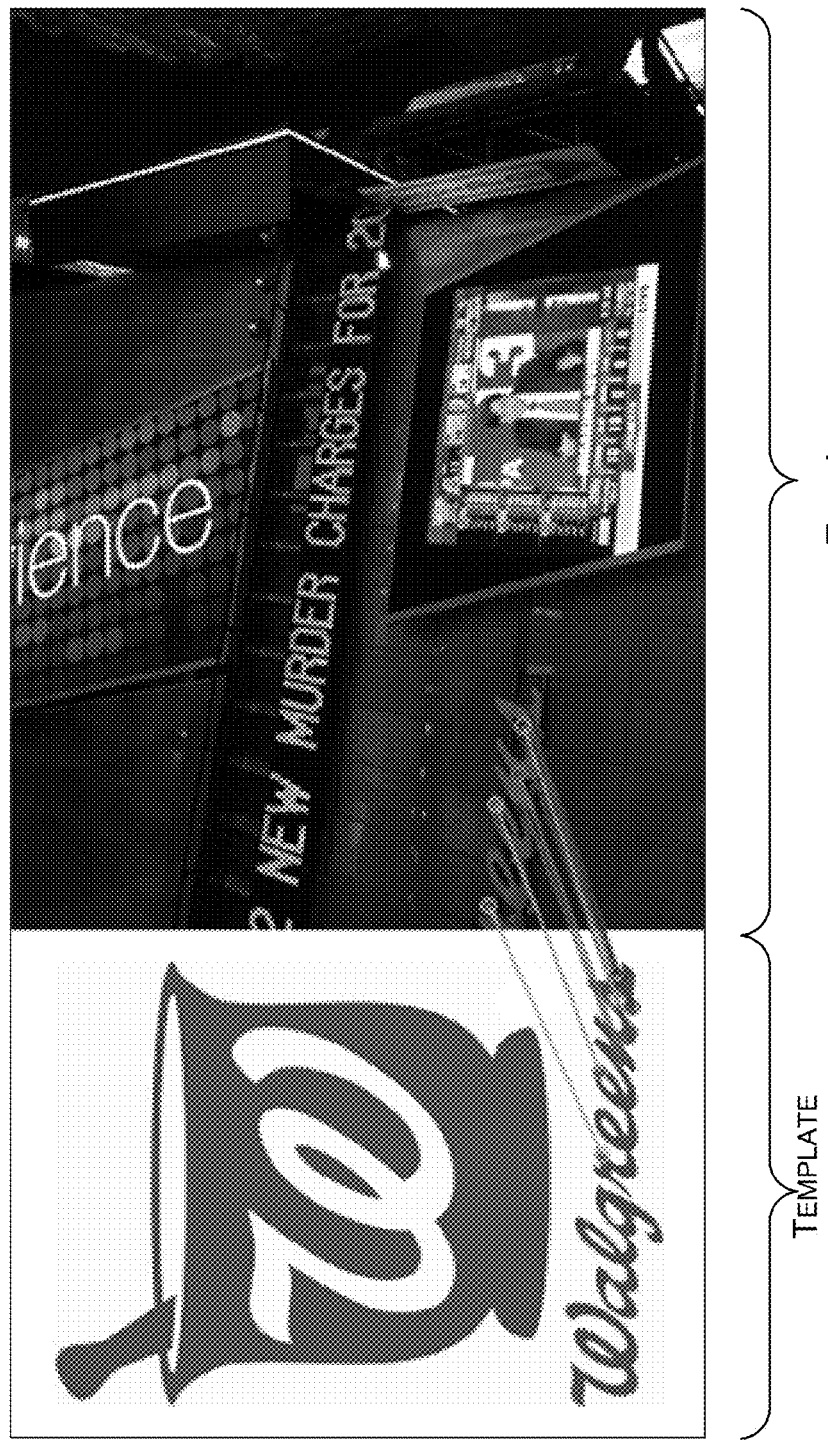
Figure 6C:
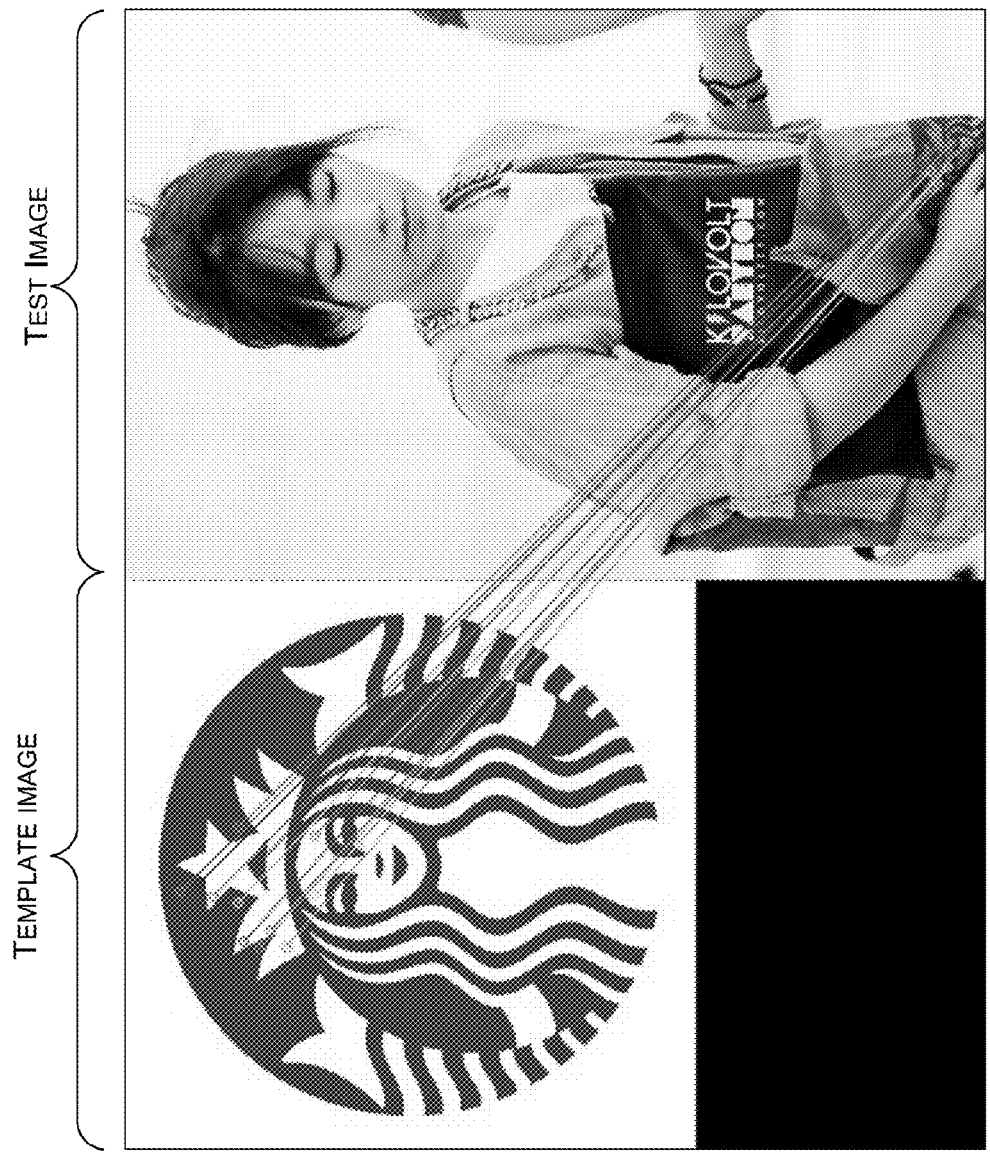

In an idealized version of matching the template appears in full in some of the test images, however real-world situations a test image may only contain a partial occurrence of the template. For example, as shown in FIGS. 6(a) and 6(b), the template image (on the left is only partially contained in the test image (on the right). In addition, some test images contain small sections that resemble the template but nonetheless are not actual matches. For example, as shown in FIG. 6(c), aspects of the test image on the right contain some sections that match the template image on the left, although a person viewing the images can tell that the template image does not actually match the test image.

The process of matching feature points between a first image and a second image is difficult when the transformation between these images contain moderate or severe changes in orientation, including but not limited by scale, angle, and skew. As is apparent, e.g., from the example shown in FIG. 6(c), the matching portion(s) of the template in the test image may comprise a relatively small image and/or a relatively small portion of the test image. When one image is a template image, typically an idealized representation of a pattern or object, the goal is to find where in a second image the template image is observed. As an extreme example, a template image may be very large, in excess of 1000×1000 pixels, while the matching location in a test image may be an order of magnitude smaller, 100×100 pixels. The extreme difference between these two images, in this case in scale, will often fail to find the match between the template image and test image.

One solution to this problem is to use multiple template images, at various sizes and transformations, to improve the ability of the system to find a match between a set of template images and a test image. The set of template images is often computed in an ad-hoc manner, covering a wide range of sizes. Another solution is to apply a more format process, such as Affine-SIFT (ASIFT) (described in Guoshen Yu, and Jean-Michel Morel, ASIFT: An Algorithm for Fully Affine Invariant Comparison," Image Processing On Line, Vol. 1 (2011), the entire contents of which are hereby fully incorporated herein by reference for all purposes) to add a set of template images to allow a fully affine invariant comparison with a test image. Although ASIFT is particular to using the SIFT feature point detector, it can be generalized to work with other feature detection schemes. One downside of using the ASIFT technique is that the number of template images required to create a fully affine-invariant comparison results in a 13-180 times increase in computation time.

An alternate solution is to carefully pick a few other template sizes that improve the sensitivity of detecting the set of template images in a test image. The problem with this method is it requires ground-truth information to identify the best template images to use.

It is desirable and an object hereof to have a way to detect occurrences of at least some portions of template images occurring in test images, regardless of the size of the test images or the size (or relative size) of the portion of the template image occurring in a test image.

The background description is provided for the purpose of generally presenting the context of the disclosure, and nothing herein should be construed as admitted prior art unless specifically so designated.

Description

Figure 1:
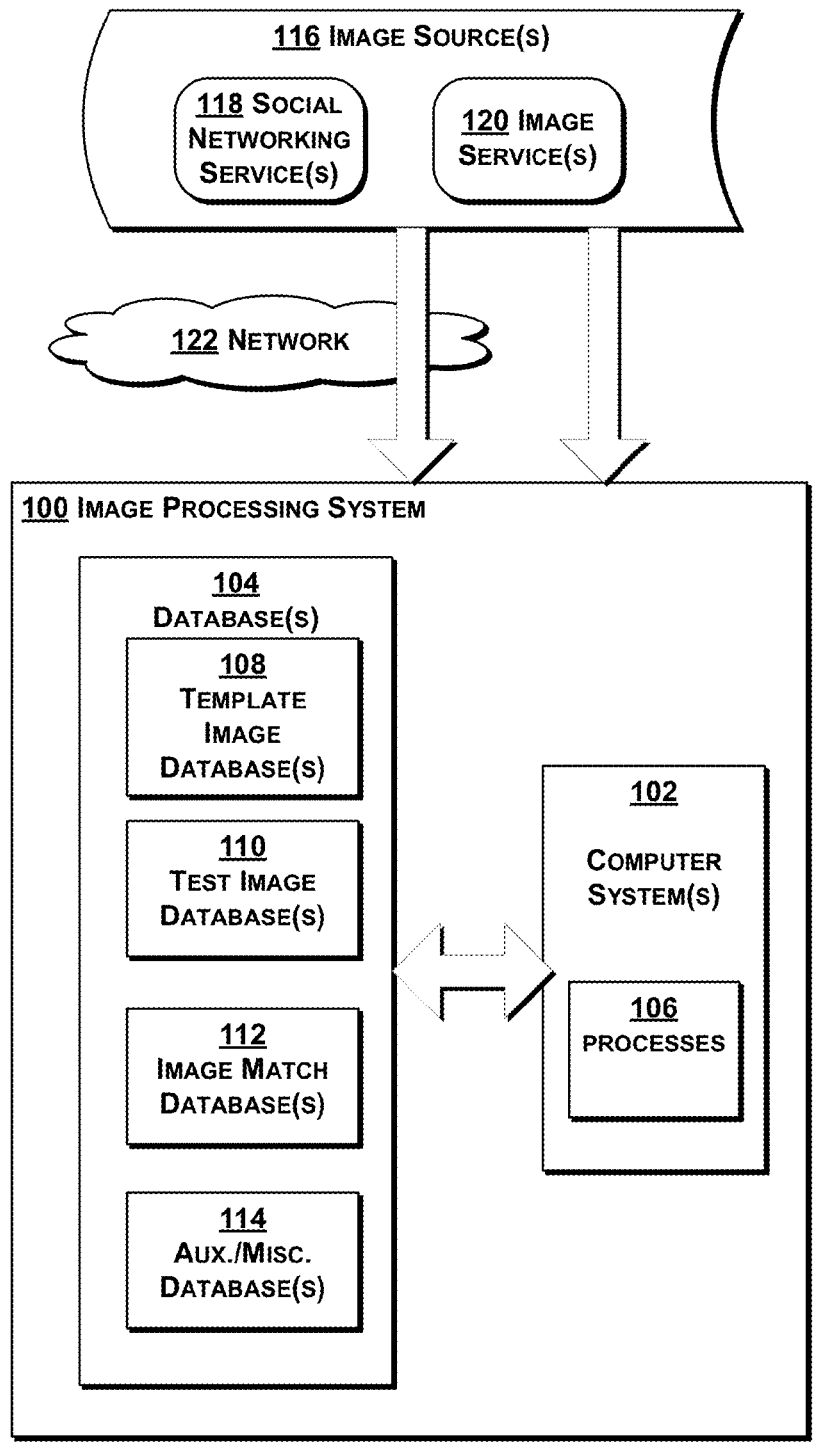
FIG. 1 depicts an overview of a system according to exemplary embodiments hereof.

As shown in FIG. 1, an image processing system 100 according to exemplary embodiments hereof includes one or more computer systems 102 operatively connected to one or more databases 104. Processes 106 running on the computer system(s) 102 interact with the databases 104 as described herein.

The database(s) 104 preferably include one or more template image databases 108, one or more test image databases 110, one or more image match databases 112, and one or more auxiliary/miscellaneous databases 114, each described in greater detail below. The one or more template image databases 108 may also be referred to herein as template image database(s) 108. Similarly, the one or more text image databases 110 may also be referred to herein as text image database(s) 110; and the one or more image match databases 112 may also be referred to herein as image match database(s) 112. The various databases may be implemented in any known manner, including as a file system in an operating system, and the system is not limited by the manner in which any particular database is implemented or maintained or accessed. There is no requirement for the databases to be implemented in the same manner. The database(s) 104 may be co-located with each other and/or with the computer system(s) 102, or they may be remotely located. The database(s) may be distributed.

The image processing system 100 obtains images from one or more image sources 116 (also referred to as image source(s) 116), which may include one or more social networking services 118 (e.g., Facebook, Twitter, and the like) and other image generating or providing services 120. The image processing system 100 may obtain the images via a network 122 (e.g., the Internet) and/or in some other manner. It should be appreciated that the image processing system 100 may obtain images from different image sources in different manners.

With reference now to FIG. 2(a), an exemplary template image database 108' may contain template image data 124 for multiple template images. As used herein, a template image refers to an image that is to be looked for in other images. A template image may be any image, including one or more of: a logo, a face, textual information, etc. A template image may be fully or partially machine generated. The system is not limited by the content of template images or the way in which they are generated, obtained, or stored.

Figures 2F, 2G:
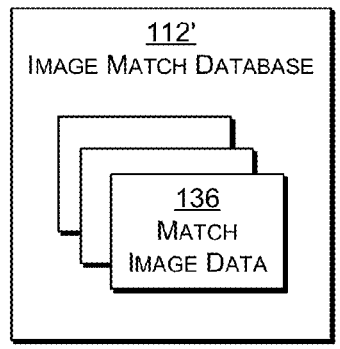
Figure 3A:
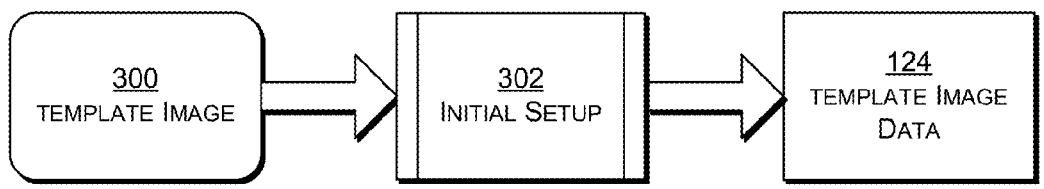
FIGS. 3(a)-3(e) show exemplary processing in the system of FIG. 1, according to exemplary embodiments hereof.

The template image data 124 for a particular template image may be generated in an offline process, as shown, e.g., in FIG. 3(a), in which a template image 300 is processed by an initial setup mechanism 302 to produce template image data 124 corresponding to the template image 300. Preferably each template image is uniquely identifiable within the system, and, as shown in FIG. 2(b), exemplary template image data 124 may include a template image identifier 126 and template image feature points 128 (e.g., generated by the initial setup mechanism 302). A copy of each template image is preferably also maintained in database(s) 104, preferably in template image database(s) 108, and each template image is preferably accessible in the database(s) 104 using its corresponding template image identifier 126.

Features are locations within the image within an image that can be used by a matching algorithm to try to find instances of a template image in a test image. The features may also include a description of the image at or near that point. Feature points are preferably picked in such a way that the equivalent locations will also be picked if the image is transformed in various ways (e.g., lighting changed, rotated, scaled, tilted). The feature descriptors are preferably designed to be invariant across a various transformations to the image.

As shown in FIGS. 2(c)-2(d), an exemplary test image database 110' contains test image data 130 for multiple test images. As noted above, test images may be obtained, e.g., from image source(s) 116. Once obtained by the system 100 images are preferably assigned a unique test image identifier 132 and are stored in test image data 130 the test image database(s) 110 associated with the test image identifier 132. It should be appreciated that it is preferable to store a copy of the test image in the test image database(s) 110. Once a test image has been processed (as described in greater detail herein), the test image data 130 associated with the test image may include test image feature points 134.

The image feature points (template image feature points 128, FIG. 2(b) and test image feature points 134, FIG. 2(d)) may be stored in an image feature points structure, such as the exemplary logical structure shown in FIG. 2(e). Assuming there are k image feature points for a particular image, the logical structure includes an index (0 to k−1) for the feature point, a location in the image (e.g., a pixel) associated with the feature point, and a descriptor of the feature point. The form of the descriptor will depend on the feature extraction algorithm used, as described in greater detail below. In a present implementation the feature descriptors are SIFT descriptors. Those of ordinary skill in the art will realize and appreciate, upon reading this description, that different and/or other descriptors may be used. For example, the feature descriptors may be SURF or PCA-SIFT or GLOH descriptors. PCA-SIFT is described, e.g., in Yan Ke and Rahul Sukthankar. 2004. *PCA-SIFT: a more distinctive representation for local image descriptors,*" in Proc. of the 2004 IEEE Computer Society Conference on Computer vision and pattern recognition (CVPR '04). IEEE Computer Society, Washington, D.C., USA, 506-513, the entire contents of which are hereby fully incorporated herein by reference for all purposes. GLOH descriptors are described, e.g., in Krystian Mikolajczyk and Cordelia Schmid "A performance evaluation of local descriptors", IEEE Transactions on Pattern Analysis and Machine Intelligence, 10, 27, pp. 1615-1630, 2005, the entire contents of which are hereby fully incorporated herein by reference for all purposes. SURF descriptors are described, e.g., in Herbert Bay, Andreas Ess, Tinne Tuytelaars, Luc Van Gool, "SURF: Speeded Up Robust Features," Computer Vision and Image Understanding (CVIU), Vol. 110, No. 3, pp. 346-359, 2008, the entire contents of which are hereby fully incorporated herein by reference for all purposes.

In a presently preferred exemplary implementation the features are detected using a Lapacian across the whole image producing one set of features for the whole image. Those of ordinary skill in the art will realize and appreciate, upon reading this description, that different and/or other approaches to feature detection may be used. For example, in some alternate approaches features may detected using SIFT or MSER, or feature sets may be found for interesting regions of the test image and each region can be matched separately.

Feature detection may find hundreds of features for the template image and similarly, hundreds of features for the test image.

Those of ordinary skill in the art will realize and appreciate, upon reading this description, that any data structures shown herein are merely examples, and that different and/or other data structures and organizations may be used.

FIG. 2(f) shows an exemplary image match database 112' containing match image data 136 for one or more (preferably multiple) images.

Figure 3B:
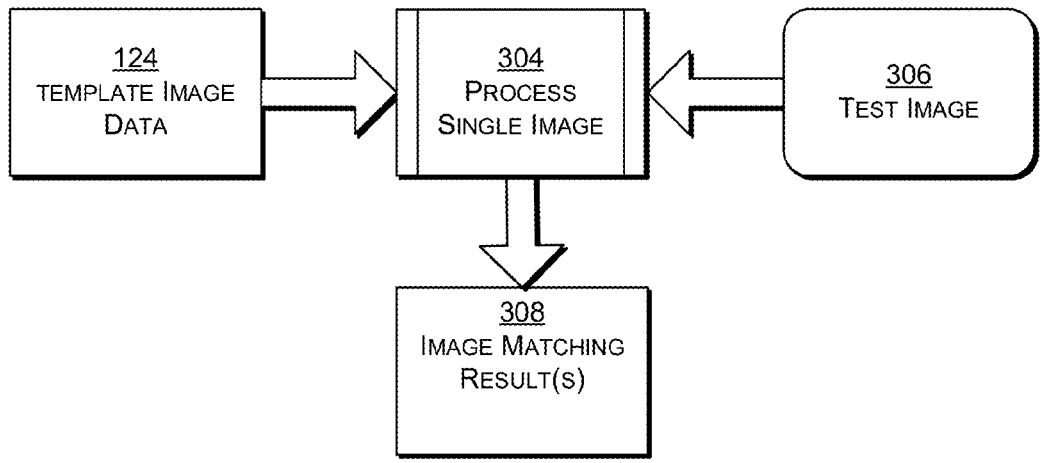

As shown in FIG. 3(b), in operation, the image processing system 100 may process a single test image 306 (at 304) with respect to particular template image data 124 to determine whether or not the template image corresponding to the template image data 124 is present in the single test image 306. If a match is found, i.e., if the process single image mechanism 304 determines with sufficient certainty that the template image corresponding to template image data 124 is present in the image 306, then the process produces image-matching results 308. The image matching results 308 may include an indication of where the template image is located in the single image 306 and may also include other information about the match. The image matching results 308 may be stored, e.g., in match image data records 136 in the image match database(s) 112.

Figure 6D:
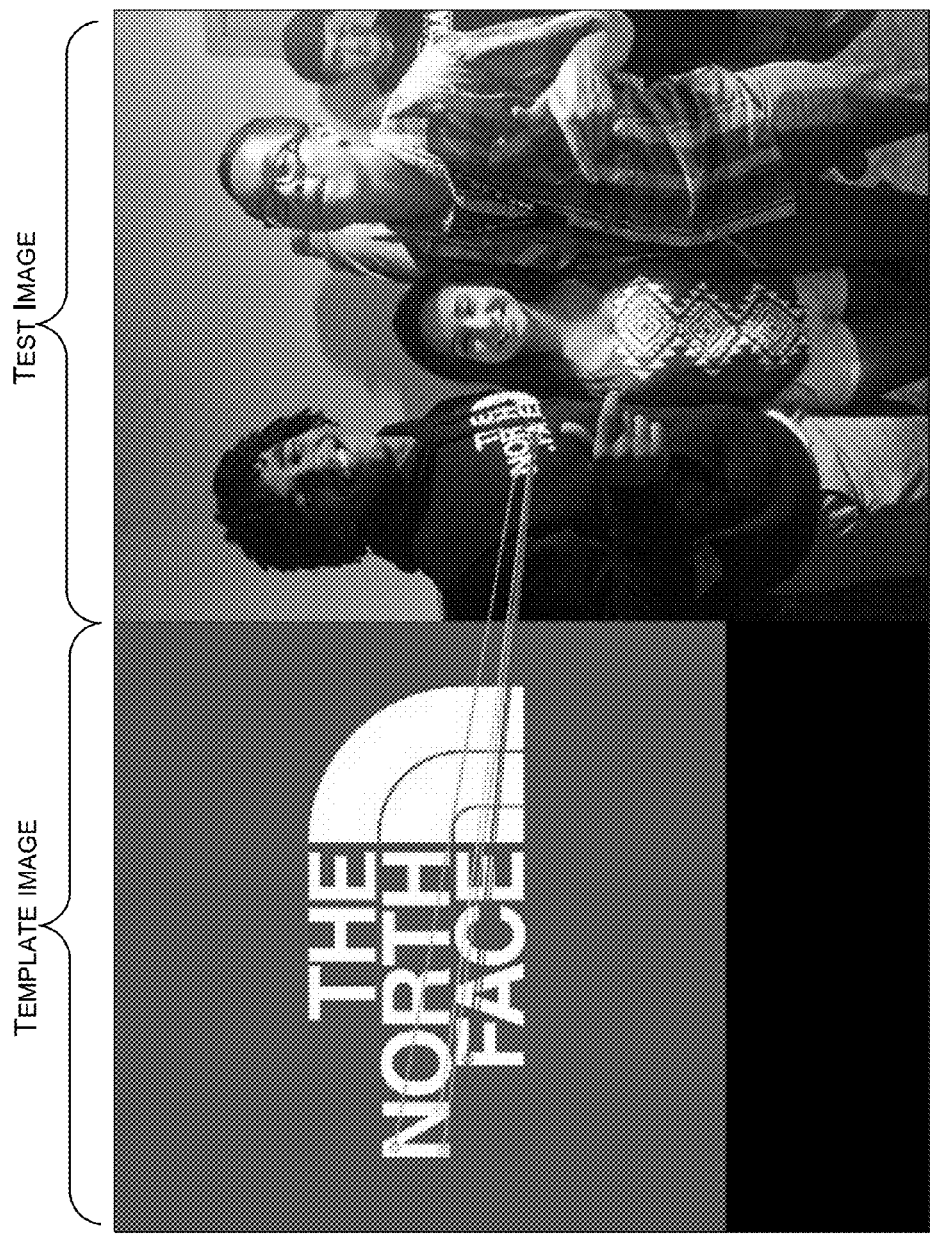

As used herein, a template image is considered to be present in a test image if at least some portion of the template image is in the test image. It should be appreciated and understood that it is not necessary that the entire template image be in the test image in order for the template to be in the test image (see, e.g., FIGS. 6(a)-6(c)), nor is it necessary for the portions of the template that are in the test image to be contiguous or uninterrupted in the test image (see, e.g., FIG. 6(d), where non-contiguous parts of the template image are in the test image).

Matching is done between features of the template images and the features of the test image, and the matching process finds feature points that correspond between the two images. Two feature points correspond/match if the descriptions of the two feature points are similar enough. A similarity measure (e.g., a distance) is used between the two points and if the distance is within some limit then the two feature points are considered matches. The results of the matching process between a template image and a test image is a set of pairs of feature points called the match set. The first element of the pair is a feature of the template image and the second element of the pair is a feature of the test image. Associated with each pair of features is a measure of the similarity of the two features.

In presently preferred exemplary embodiments hereof, as shown e.g., in FIG. 2(g), in some modes, the match image data 136 may include: (i) a test image identifier 138 (corresponding to the unique identifier of the matched test image in the system); (ii) a template image identifier 140 (corresponding to the unique identifier of the matched template image in the system); (iii) (v) the number of feature points in the template 146; and (iv) a match set 148. It should be appreciated that some of these fields may not be present or used in all embodiments hereof.

Figures 2H, 2I:
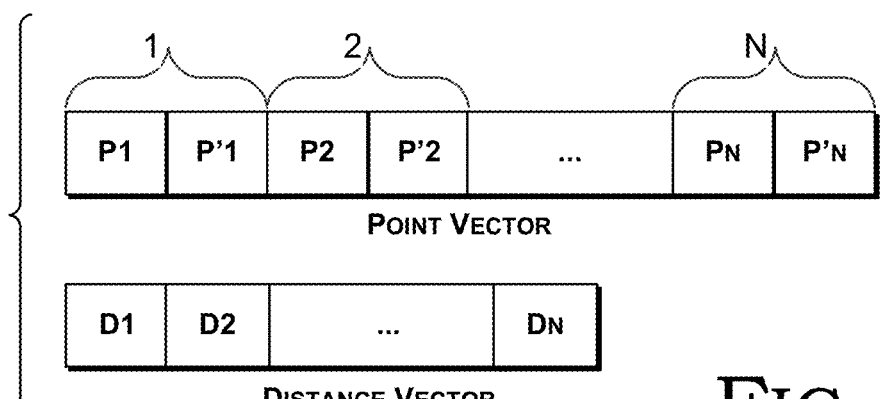

An exemplary match set (which may be part of the match image data 136) preferably includes a list of matched points from the template image and the test image, along with the distance between them. Thus, e.g., the exemplary match set 148' in FIG. 2(h) includes N matches $(P_1, P'_1), (P_2, P'_2), (P_N, P'_N)$, with corresponding distances $D_1, D_2, \ldots, D_N$. In this example, according to the matching algorithm, point $P_i$ in the template image matches or corresponds to point $P'_i$ in the test image, for i=1 to N, where $D_i$ is a distance for points $P_i$ (in the template image) and $P'_i$ (in the test image). In some implementations a match set 148 may be stored as a point vector comprising pairs of matched points along with a distance vector of the corresponding distances.

As shown in FIG. 3(b), the mechanism 304 attempts to match a single template image with a single test image. However, in operation, a system 100 may attempt to match a particular test image with multiple template images, as shown, e.g., in FIG. 3(c). The mechanism 304 (to process a single test image with respect to a single template image) may thus be invoked repeatedly for multiple template images whose template image data 122 are stored in the template image database(s) 108. In some exemplary embodiments the routine 304 may terminate when a match is found for a template image. In other embodiments the mechanism 304 may continue to look for other matches (e.g., with other template images) even after a match is found.

As shown above with reference to FIG. 1, image-processing system 100 may obtain test images from image source(s) 114. These test images may be obtained in a batch and/or as one or more streams of images 310. For example, there may be a stream of images corresponding to each image source. With reference to FIGS. 3(d)-3(e), the process image stream(s) mechanism 308 processes the images 306 in image stream(s) 310 (from the image source(s) 114) to determine whether one or more template images match images in the image batch/image stream(s) 310. In some embodiments this process may be implemented by repeatedly invoking the process single image mechanism 304 for images in the image stream(s) to determine whether any template images match the image stream images.

The mechanisms (process single image, process image stream(s), etc.) may correspond to processes 106 running on the computer system(s) 102.

In a some real-world system, the image streams may contain millions of images, produced at a rate exceeding 2 million images per day (about 1,400 images per minute).

Processing a Single Image

Figure 3C:
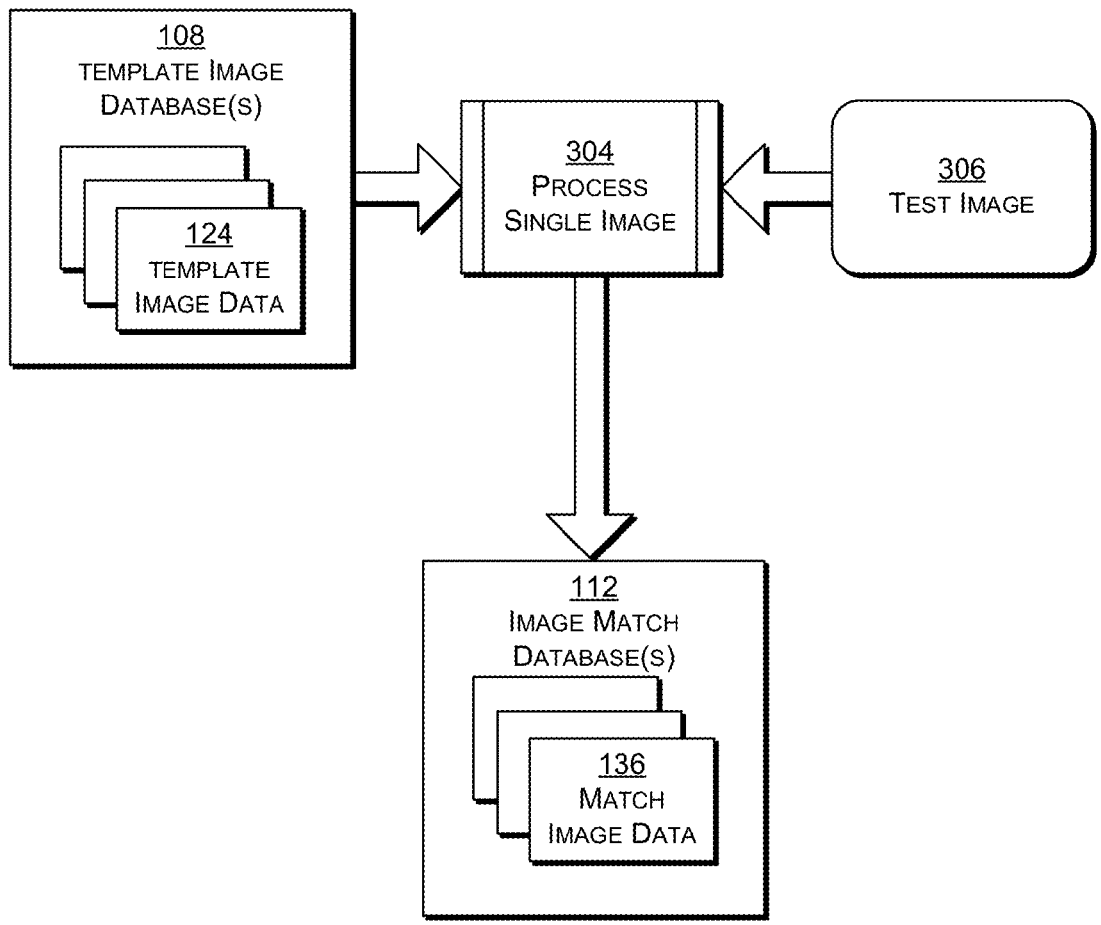
Figure 3D:
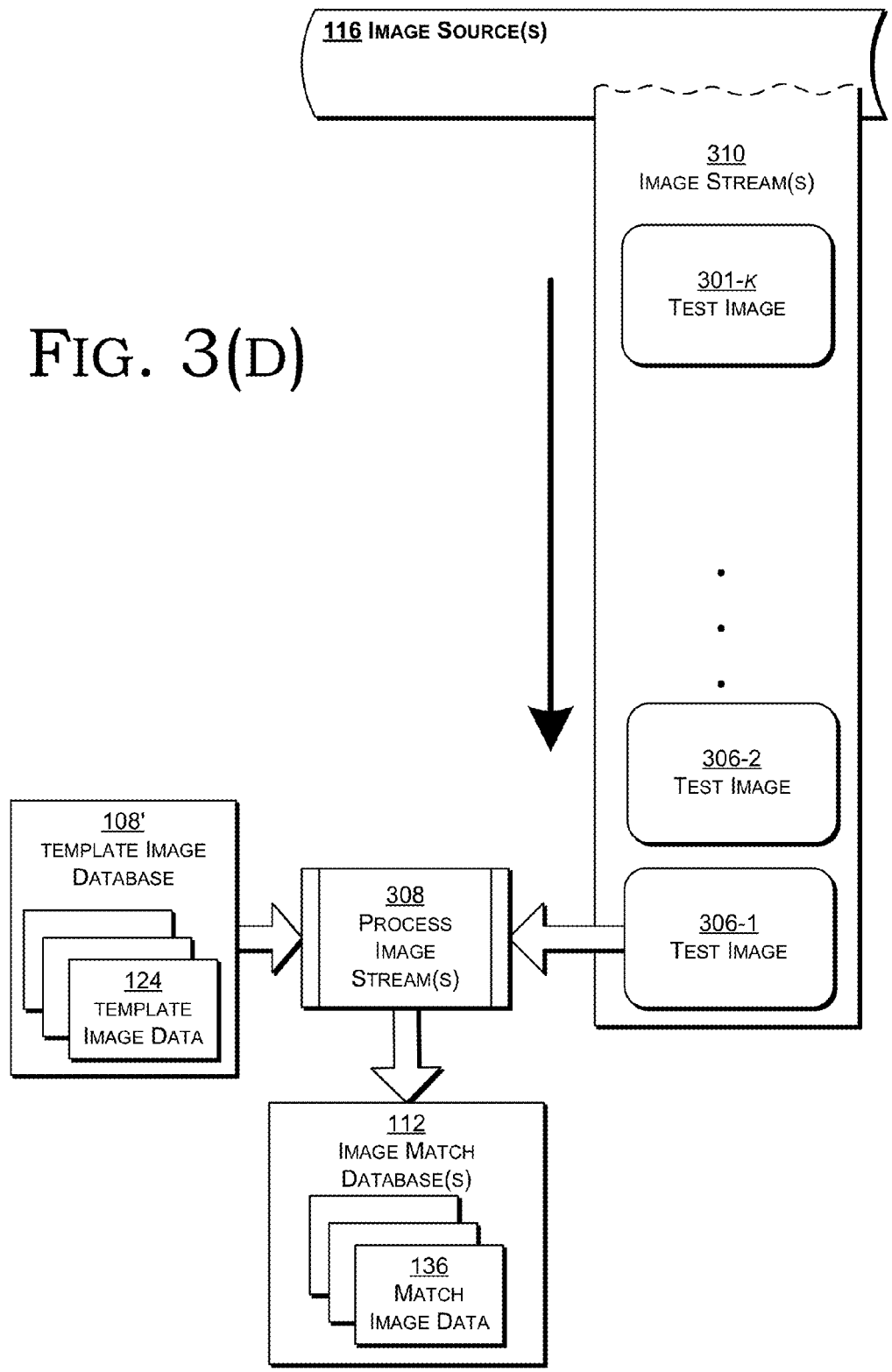
Figure 3E:
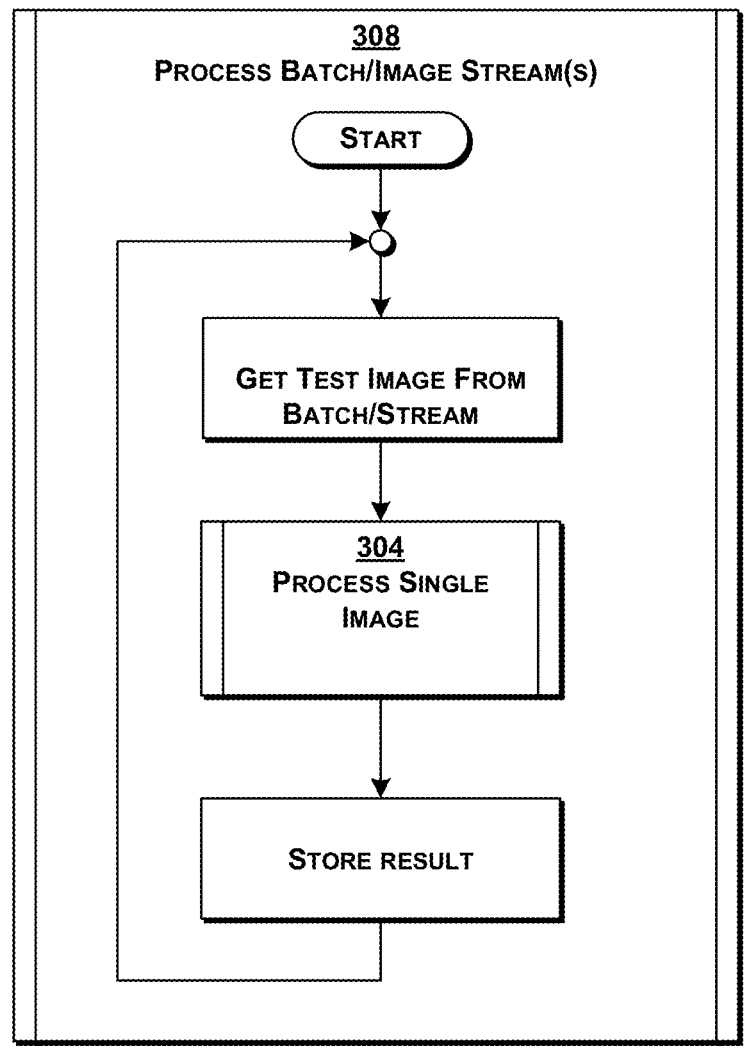

An exemplary mechanism to process a single image (corresponding to 304 in FIGS. 3(b) and 3(c)) is described in David G. Lowe, "Distinctive Image Features from Scale-Invariant Keypoints," Int. J. Comput. Vision 60, 2 (November 2004), 91-110, hereinafter "Lowe", and in U.S. Pat. No. 6,711,293, to Lowe, the entire contents of both of which are hereby fully incorporated herein by reference for all purposes. Lowe's technique is sometimes referred to as SIFT.

An image may be decomposed into a number of feature points to describe the visual content of the image. Feature points may be generated at predetermined locations (i.e., at a certain position, and radius) in an image, or computed from features found in an image. When feature points are chosen that are invariant to change (such as to translation or rotation), these feature points may be used to determine whether two images are related to each other.

For example, if two photographs are taken of the same scene from slightly different vantage points, each image will contain similar features in the overlap region between the images. When the feature points from each image are compared, it is possible to determine if the two images are related, and the coordinate transformation of how they are related.

Feature point matching may also be used to see if a template is found in an arbitrary image. A template may be a real or an artificial image that expresses a pattern to be found in the image. The template may be any image, including a computer generated brand logo. In this case, the matching operation can determine if the brand logo is present in a second image, and if so, where in the second image the brand logo is located.

Matching a template against an image generally includes a number of steps, namely:
1. Feature point extraction from the template image.
2. Feature point extraction from a test image.
3. Match feature points from template image with feature points in a test image.
4. Match feature points in a test image with the feature points from the template image.
5. Eliminate non-symmetrical matches.
6. Compute the best image transformation between the matching points.
7. Determine if the template image is present in the test image.

Feature Point Extraction

There are many feature detectors that may be used to implement the feature point extraction of the first two steps, including ones such as SIFT (Scale-Invariant Feature Transform), and SURF (Speeded Up Robust Features) that can detect features which are scale and rotationally invariant.

Feature point extraction from an image consists of two steps. The first step is to determine positions in the image that are stable (i.e., that do not move) over small and moderate amounts of image transformation such as scale and rotation. These locations define so-called keypoints in the image. A keypoint describes a two-dimensional (2D) location (e.g., (x, y) coordinates) and the angle (or orientation) of the feature (SIFT keypoints specify a 2D location, scale, and orientation).

The second step of feature point extraction is to extract a so-called descriptor (e.g., a numeric signature) from each feature point. For example, an implementation of the SIFT descriptor has 128 values that encapsulate the orientations in a region that surrounds the keypoint. Numeric descriptor values are often normalized such that the descriptor is of unit length. This normalization improves the descriptors invariance to illumination changes.

It should be appreciated that steps 1 and 2 generally differ as to when the feature point extraction is computed. Typically the template image is known in advance and the feature point information can be constructed beforehand. Feature point extraction of a test image may be computed when the image is analyzed, and compared with the previously computed information from the template image.

Matching Feature Points

The third and fourth steps match (or attempt to match) feature points from one image to feature points from another image. This matching may be accomplished, e.g., by computing the nearest neighbors of each descriptor from a first image to descriptors in a second image. Descriptors come in many varieties ranging from binary (one-bit of information) to numeric for each element in the descriptor. For numeric descriptors, the nearest neighbors may be determined by the descriptors with the shortest distance. Although many distance formulas can be used, the L2 (Euclidean) distance is preferred. For each descriptor in one image, the closest matches (usually two) from the second image are computed.

Lowe describes a ratio test that computes the ratio of the smallest distance from a keypoint in a first image to a keypoint in a second image, to the second smallest distance from the same keypoint in the first image to a second keypoint in the second image. A large ratio (Lowe used a threshold of 0.8) may be used to indicate that two keypoints in the second image are similar to the keypoint in the first image. When this condition arises, there is no matching keypoint in the second image to the keypoint in the first image. This process is carried out by comparing every keypoint in one image to the keypoints in the second image.

The third and fourth steps differ in the direction of matching. In the third step the keypoints from the template image are compared with the keypoints in the test image. In the fourth step the keypoints in the test image are compared with the keypoints in the template image.

Eliminating Non-Symmetrical Matches

The fifth step enforces a constraint that the best matching points between a first image and a second image should be the best matching points between the second image and the first image. This symmetric matching step discards the matches found in the third and fourth step if the best matches do not refer to each other.

Computing the Best Image Transformation Between the Matching Points

The sixth step takes as input the keypoints from the template image that match the keypoints in the test image, and computes a geometric relationship between the points in each image. Many different methods can be employed to determine these relationships, including using a Hough transform (see, e.g., Lowe), affine transformation, or homography. A homography computes the projective transform to describe the relationship between two coordinate systems. The points determined from the fifth step do not necessarily share the same geometric transformation. One reason is that the points come from different, non-related, portions of the image. Another reason is that points belong to related objects, but the objects are grossly distorted. The RANSAC (RANdom SAmple Consensus) algorithm may be employed to find the best subset of matching points to compute the best transformation between two images. The RANSAC algorithm is described in Fischler, M. A., et al (June 1981), "Random Sample Consensus: A Paradigm for Model Fitting with Applications to Image Analysis and Automated Cartography," Comm of the ACM 24 (6): 381-395, the entire contents of which are hereby fully incorporated herein by reference for all purposes.

Determining if the Template Image is Present in the Test Image

The seventh step identifies whether the template image is present anywhere in the test image. The result of the sixth step is either: (i) no homography (insufficient matching points exist between the template image and test image), (ii) an incorrect homography, or (iii) a valid homography.

An invalid homography is one in which the matching points between the template image and test image returns a mathematically valid result, but one which is impossible in the natural world. Invalid homographies are treated as though no homography was computed.

A valid homography is used to establish the coordinate system relationship between points in the template image with the points in the test image. However, the homography might be valid only over a small region of the image, rather than over the entire area of the template image. In some cases this is acceptable if the template in the test image is obscured or distorted. In other cases, the matching region may be small because the template image is not found in the test image. For example, a portion of a letter in the template image may match the corresponding letter in the test image. This does not mean that the template image is present in the test image, only that they share a small common region. One common method to determine if the template image is present in the test image is to define a minimum overlap size between the template image and test image. A match between the template image and test image is returned only if the overlap area exceeds this threshold.

Feature Point Optimization

In some aspects hereof, a single template image is used to produce an array of template images whose feature points are then compared to each other. The goal of this comparison is to the find points in the template image that are the most immune to image transformations. In preferred embodiments hereof, the most important transformations that might be applied to the template images are scale changes because the underlying feature detection used (a SIFT-like feature detector) is invariant to rotation changes. An invariant feature point is determined if the same feature point is found in at least N images from the set of template images for some value N. This invariant feature point determination uses both the Euclidean distance between the location of the feature points as well as the distance between the feature descriptors computed at these locations.

Figure 7:
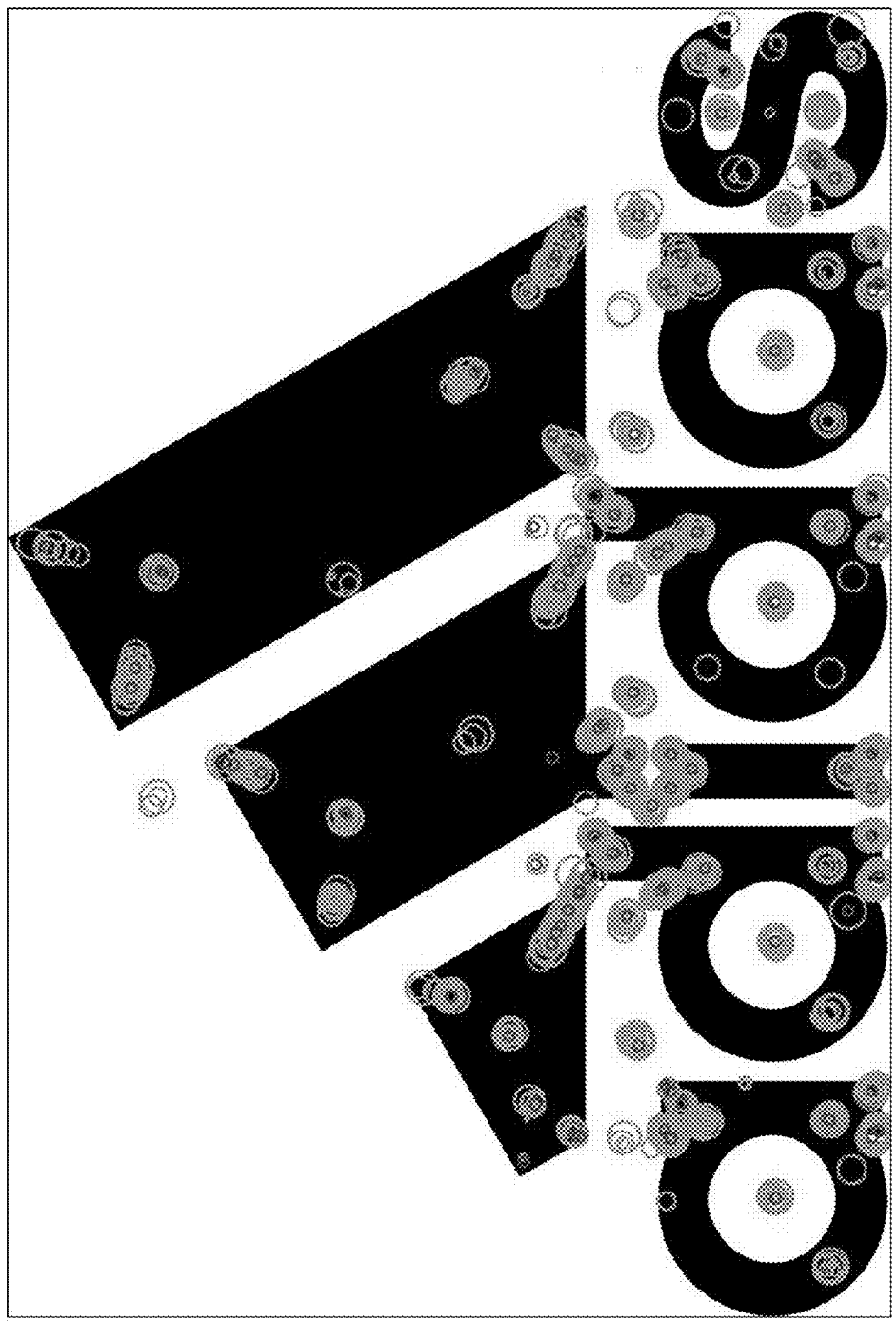
FIG. 7 shows aspects of feature point optimization according to exemplary embodiments hereof.

An exemplary visualization of the matching a set of template images produced from a single template image is shown in FIG. 7 in which red circles indicate feature points from the original, start template image and green circles show the feature point locations of many reduced resolution versions generated from the template image. In the drawing in FIG. 7 a different size circle is used to depict/identify a separate reduced resolution image. Feature points that are found in one, or a few scales, are not very stable and are candidates to be eliminated. Some feature points are less stable and move as the scale of the template image is changed (see FIG. 7), and are displayed as a set of similar but non-concentric circles, or as a line of circles. In this case, a decision must be made as to the number, and location, of feature points to retain. In preferred embodiments hereof, this decision may be guided by the number of stable feature points found in the image, as well as their geometric distribution in the template image. By establishing a desired number of feature points to keep, some of these less-stable feature points are retained by creating many feature points encapsulating the location of a single feature point at multiple scales.

In another aspect hereof, multiple template images may be used to produce an array of template images whose feature points are compared to each other. The template images may be derived from a pristine version of the template image, but may be blurred, stretched, or otherwise distorted to emulate the manner in which the template image may be observed in real (i.e. natural) images. The visualization of the feature points is similar to that shown in FIG. 7 except that the distribution of points looks like a cloud of points rather than near-concentric circles. The process of determining the best feature points may then be carried out in the same manner as the previous aspect hereof. The distance threshold to identify a matching point between the template image and test image may be increased to account for the size of the point clouds.

The result of this optimization process is a composite set of feature points produced from an array of template images. The matching steps to identify if the template image is found within a test image are the same as though the feature points were generated from a single template image. When a candidate match is found between the composite set of feature points and the test image, it is sufficient to say that the template image is found within the test image. In preferred embodiments hereof, at least one additional step may used to verify the presence of the template image in the test image. The composite set of feature points may be constructed from many input images, and it is possible that some matching points belong to similar, but different, representations of the template image. To remove this ambiguity, a matching step may be performed between a template image of similar size to the size of the potential match in the test image. The matching points from this sized template image can be pre-computed, or constructed on the fly, when needed. In preferred embodiments hereof, the image may be computed on-demand to be the same size as the candidate match in the test image. An additional step of boosting the matching points may also be performed to improve the confidence that the template image is found in the test image.

Figure 4:
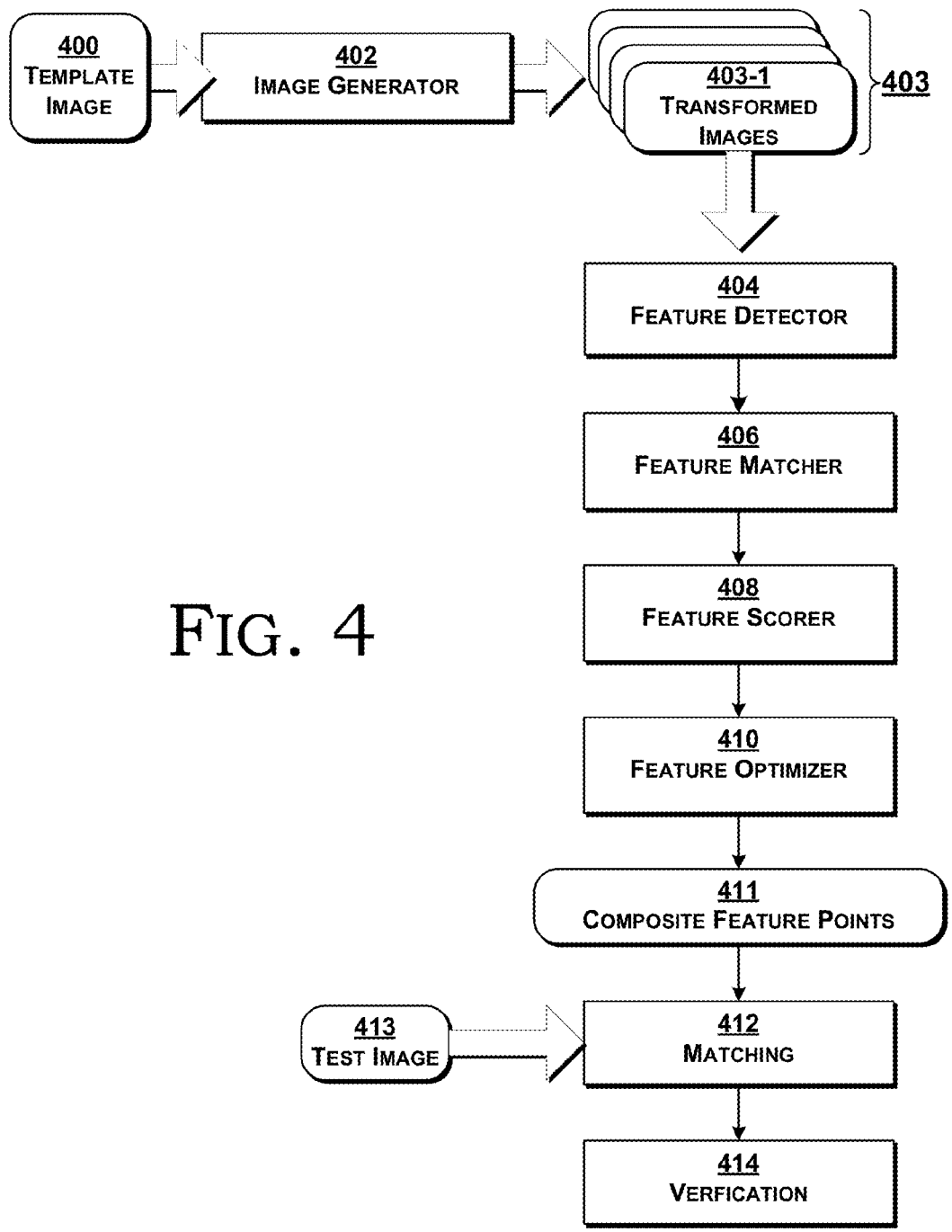
FIG. 4 is a block diagram showing exemplary processing according to exemplary embodiments hereof.

FIG. 4 is a block diagram illustrating a system according to exemplary embodiments hereof for optimizing the feature points from template image 400 to match against one of more test images 413.

In some embodiments hereof, a single template image 400 may be converted into a set of transformed images 403 by image generator 402. Image generator 402 may apply one or more image transformations to the template image 400, and/or to intermediate, transformed images, in order to construct a number of transformed images 403. Image transformations include, but are not limited to, one or a combination of: scale, rotation, skew, and other distortions. In preferred embodiments, a SIFT-like feature detector may be used, and the image transformations may alter the scale of the image (since a SIFT feature detector is invariant to image translation, and tolerant to image rotation). Preferred embodiments hereof may usefully create a large number of transformed images, using a small-scale change between subsequent images. Using a small-scale change between images allows other steps in the algorithm to track how and where feature points move as the scale is altered.

In other embodiments hereof, multiple template images 400 may be converted into a set of transformed images 403 by image generator 402. The multiple template images 400 may be related to a single, pristine, version of the template image, or they may include, but not be limited to, different viewing angles or lighting conditions. Image generator 402 applies a number of image transformations on the template images 400, and intermediate, transformed images, to construct a number of transformed images 403. Image transformations include, but are not limited to, one or a combination of scale, rotation, skew, and other distortions. In presently preferred embodiments hereof, a SIFT-like feature detector is used, and the image transformations alter the scale of the image (since, as noted, a SIFT feature detector is invariant to image translation, and tolerant to image rotation). Presently preferred embodiments hereof may also usefully create a large number of transformed images, using a small-scale change between subsequent images. Using a small-scale change between images allows other steps in the algorithm to track how and where feature points move as the scale is altered.

Feature detector 404 computes feature point information from the transformed images 403. Feature points describe the visual content of images and may be generated at predetermined locations (i.e., at a certain position, and radius) in an image, or computed from features found in an image. In presently preferred embodiments hereof, feature points may usefully be chosen that are invariant to change (such as to translation or rotation) using a SIFT-like feature detector and locates keypoints in an image, followed by computing feature descriptors at these keypoint locations. Feature detector 404 computes the feature points for each image in transformed images 403.

Feature matcher 406 accepts feature points from feature detector 404 computed from each transformed images 403. Each feature point image represents the feature points from one image produced by image generator 402. Feature matcher 406 collects the composite information from the feature points from every transformed image 403. The composite information can be assembled using matching steps (e.g., as described in co-pending and co-owned patent application No. 62/022,592 filed Jul. 9, 2014, and in U.S. application Ser. No. 14/745,353, filed Jun. 19, 2015, the entire contents of both of which are fully incorporated herein by reference for all purposes) to find symmetrical matching points between two images, and combining this information, image by image, until each image in transformed images 403 is related to other images in transformed images 400, creating a composite set of matching points. In presently preferred embodiments hereof the transformed images 403 may be computed at a multitude of scales, and each transformed image in 403 may be compared with the transformed image one step larger in scale, and compared with the transformed image one step smaller in scale. The image transformation from every transformed image 403 is known with respect to template image(s) 400, allowing the image transformation between transformed images of neighboring scales to be computed. For every feature point in a transformed image I(n), the expected position of features points in neighboring transformed images, I(n−1) and I(n+1) may be examined to see if the feature point from I(n) can be found in the neighboring images, and how much the feature point is moved. In addition to using the 2D (i.e., (x, y)) location of the feature points, a feature descriptor distance may be used to confirm that the feature points refer to the same feature. To enhance the speed of matching the features between transformed images 403, the matching process may only compare one transformed image with the least smaller transformed image. The composite information computed by feature matcher 406 shows the location (x, y) (i.e., 2D location) of every matching feature point from every image in transformed images 403. In presently preferred embodiments hereof, image scale is the difference between each transformed images 403, providing the composite image with the location and scale of every matching feature point from the collection of transformed images 403.

The composite information produced by feature matcher 406 can be ad-hoc in nature, but in presently preferred embodiments hereof, it is an array of all the feature points, where each element in the array of feature points is an array of (x, y) locations where the feature point were found and the image scale from the associated transformed image. As image generator 402 transforms the template image(s), it is possible to track the expected locations of features as they undergo the image transformations used by image generator 402. In presently preferred embodiments hereof, the comparison of feature points in image I(n) with the feature points in image I(n−1) have three possible outcomes. The comparison between two feature points uses the Euclidean distance between the (x, y) location of the feature points and the L2 distance of the feature descriptors. The first outcome is when a feature point in image I(n−1) is found near the expected position for the same feature point in image I(n). The entry for the feature point in the composite information is modified to include the feature point location and scale from image I(n−1). The second outcome is when a feature point in image I(n−1) is not found near the expected position for a feature point in image I(n). This outcome occurs when no feature point is found within a first threshold using Euclidean distance between the (x, y) locations of the feature points and a second threshold using the L2 distance between the feature descriptors. For the second outcome, no entry is made in the composition information. The third outcome is when feature points are found in I(n−1) with no corresponding feature point in I(n). This can be computed by matching feature points in I(n−1) with the feature points in I(n), or by a process of elimination during the matching of feature points in image I(n) with the feature points in image I(n−1). For the third outcome, a new entry is made in the composite information to identify each new feature point found in image I(n−1) that was not found in image I(n).

Feature scorer 408 takes the composite information produced by feature matcher 406 to determine how the feature points in the composite information relate to the individual images from transformed images 403 and the original template image(s) 400. In presently preferred embodiments hereof, the composite information is modified by re-ordering the data by the number of scales in which the same feature point is found, as well as the largest Euclidean distance observed between a set of matching feature points. For each feature point found in any of the transformed images 403, the list of (x, y) image location and image scale for each matching feature point is stored, as well as the largest distance between any two of the feature points in the list.

Feature optimizer 410 performs the task of computing a set of feature points that describes the set of feature points determined from the transformed images 403. The optimizer 410 uses the composite information generated by feature matcher 406 and modified by feature scorer 408. A first input parameter is the desired amount of optimization to perform on the composite information in order to produce feature point information that can be used for matching against a test image 413. In presently preferred embodiments hereof, the optimizer accepts a desired number of feature points either as an absolute number or as a scaling factor applied to the number of feature points found in the template image(s) 400. A second input parameter is the disposition of similar, but non-colinear feature points found in the composite information. Colinear feature points are defined as points that are within a specified distance from each other. In presently preferred embodiments hereof, the coordinates of a set of colinear points is the average position of the set of points. Non-colinear feature points represent an identical feature points found in separate images in transformed images 403, that do not correspond to the same (x, y) location when transformed to a common coordinate system. These non-colinear feature points can be divided into two categories. The first category is when the non-colinear feature points can be considered to be a collection of N colinear feature points (N>1). The second category is when the coordinates of the non-colinear feature points create a point cloud (i.e., there is no set, or very few sets of colinear points). A third input parameter is the disposition of lone feature points, or feature points that contain less than a specified number of matching feature points in the composite information. Some feature points exist in only a single, or a small number, of transformed images 403. This indicates that the feature points are not stable over a wide range of the image transformations applied by image generator 402. However, this does not mean that the feature point is not important for a particular, or small set, of transformed images 403. In presently preferred embodiments hereof, the optimization considered two points. The first point uses the ordered set of matching feature points returned by feature scorer 408, and the first input parameter to decide which points become part of the composite feature points 411, and which points are discarded. The second point runs during the traversal of the feature points returned by feature scorer 408, and identifies non-colinear feature points and their disposition. If a set of non-colinear feature points can be divided into sets of colinear feature points, these sets of feature points may be stored in the appropriate position in the composite information as separate feature points, and processed based upon the number of feature points in the set. If a set of non-colinear feature points represents a cloud of feature points, up to N feature points can be created for the point cloud, where N is an input parameter and the points may be chosen uniformly along the cloud of points. The final step of feature optimizer 410 is to insure that the composite feature points 411 contains the appropriate number of feature points as determined by the input parameters.

Composite feature points 411 are computed by feature optimizer 410 and contain the features from a set of transformed images 403. The feature points may be stored in a uniform coordinate system, and in presently preferred embodiments hereof, the coordinate system chosen is that of the template image 400. This choice allows the direct substitution of the feature points determined from template image 400 with the composite feature points 411.

Matching 412 performs matching between a test image 413 using composite feature points 411 from a number of transformed image 403 based on template image(s) 400. The steps of matching features between two images is well established and in presently preferred embodiments hereof uses the elements of boosting match points (described in U.S. patent application Ser. No. 14/745,353, filed Jun. 19, 2015, fully incorporated herein by reference for all purposes). In presently preferred embodiments hereof, additional steps may be added during the matching process. The first additional step occurs because composite feature points 411 can contain duplicate feature points with different locations and feature descriptors. The additional first step is used to match a feature point only once. When the matching process determines a match between a composite feature point 411 and a feature point extracted from test image 413, any feature points in the composite feature points 411 originating from the same feature point may be ignored. A second additional step is added after feature point matching, either before or after match boosting, when there is an insufficient number of matching points to reliably detect that template image 400 is found in test image 413. The matching feature points from composite feature points 411 may be tabulated to see what set of transformed images 403 generated them. When the best scale, or other image transformation applied by image generator 402, is determined, a new template image using the best image transformation is generated. The new template image can be pre-constructed or dynamically generated, and is used to match against a test image 413. Using a template image of similar size and orientation to a test image 413 improves the number of matching points between the template image and test image 413.

Verification 414 inspects the matching points from matching 412 to insure the points accurately describe a match between template image 400 and test image 413. Some matching points used from composite feature points 411 may not exist in template image(s) 400 because these points were only found in a few (or one) images from transformed images 403. In presently preferred embodiments hereof, when a custom-sized template image is not constructed during matching 412, two different verification steps can be employed. A first verification step is to compute a feature descriptor in template image 400 at the location, scale, and rotation of the matched point from composite feature points 411. These missing feature descriptors from template image 400 may be pre-computed for every composite feature point 411 that does not exist in template image 400. The distance between any missing feature descriptors in template image 400 and the matched feature points from matching 412 must be within a prescribed distance. If the distance exceeds this threshold, the matched feature point is removed from the set of matching points. A second verification step uses the geometrical relationship of matching points between template image 400 and test image 413, in a region where there is no matching feature point from template image 400. The test ignores any non-linear changes between the template image 400 and test image 413 to fit an affine transform using at least 3 neighboring match points. When there are fewer than 3 neighboring match points within a prescribed radius of a matched feature point, this check is not performed. When an affine transform is computed, the distance between the predicted location of a matched feature point with the actual coordinates is computed. If this distance exceeds a threshold, the matched feature point is removed from the set of matched points.

Although this approach is described here for a single template image, those of ordinary skill in the art will realize and appreciate, upon reading this description, that the technique may be applied to multiple template images. In presently preferred exemplary embodiments hereof the above technique of feature point optimization may be applied to some or all of the template images in the template image database(s) 108. The composite feature points (CFPj) for each template image (TIj) may be stored in database(s) 104 (e.g., in template image database(s) 108), using an association such as shown in FIG. 2(j). Thus, for a given template image (TI), the composite feature points (CFP) for that template image may be obtained and used by a matching mechanism, as described herein.

Application of Techniques

The framework, system, techniques and mechanisms described herein have general applicability. However, in a presently preferred implementation the template images comprise logos and the like corresponding to products (e.g., goods and services) related to certain companies or other entities.

As used herein a logo refers to any symbol, image, text, or other design, or combination thereof, adopted or used by an entity to identify its products, goods, services, etc.

In some cases the system may use multiple versions of the same logo (e.g., at different sizes).

In operation multiple test images in one or more input streams are processed with respect to multiple logos from multiple entities.

Template images found in a test image may be used to provide targeted advertising.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 5:
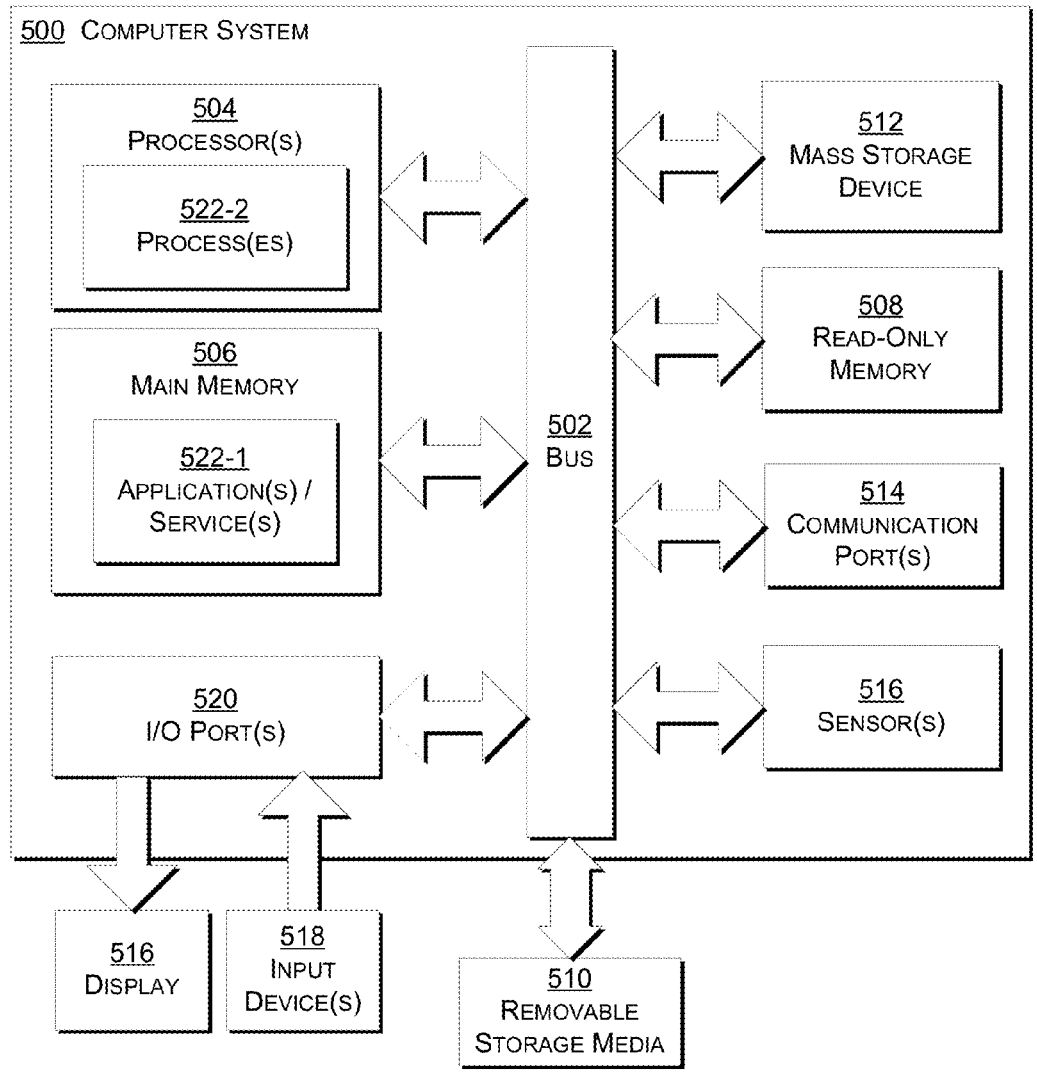
FIG. 5 is a schematic diagram of a computer system.

FIG. 5 is a schematic diagram of a computer system 500 upon which embodiments of the present disclosure may be implemented and carried out.

According to the present example, the computer system 500 includes a bus 502 (i.e., interconnect), one or more processors 504, one or more communications ports 514, a main memory 506, removable storage media 510, read-only memory 508, and a mass storage 512. Communication port(s) 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like. Processor(s) may include one or more graphical processing units (GPUs) which may be on graphic cards or stand-alone graphic processors.

Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that support(s) the functionality as discussed herein (an application 522 may be an application that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries(carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based and computer communication (e.g., based on network traffic and distances), and these delays may cause delays in data reaching various components Inherent delays in the system do not change the real-time nature of the data. In some cases, the term "real-time data" may refer to data obtained in sufficient time to make the data useful for its intended purpose. Although the term "real time" may be used here, it should be appreciated that the system is not limited by this term or by how much time is actually taken to perform any particular process. In some cases, real time computation may refer to an online computation, i.e., a computation that produces its answer(s) as data arrive, and generally keeps up with continuously arriving data. The term "online" computation is compared to an "offline" or "batch" computation.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner A list may include duplicate items. For example, as used herein, the phrase "a list of XYZs" may include one or more "XYZs".

It should be appreciated that the terms "first", "second", "third," and so on, if used in the claims, are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering. Specifically, use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The foregoing is merely illustrative and not limiting, having been presented by way of example only. Although examples have been shown and described, it will be apparent to those having ordinary skill in the art that changes, modifications, and/or alterations may be made.

Thus is provided a framework for finding template images in test or target images, in including using feature point extraction improve match quality and speed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented, implemented by hardware in combination with software, the method comprising:
   (A) producing multiple template images from a particular template image, said multiple template images being produced by multiple transformations of said particular template image;
   (B) for each of said multiple template images and for said particular template image determining a corresponding set of feature points;
   (C) determining a composite set of feature points from feature points associated with each of said multiple template images, said composite set of feature points comprising invariant feature points selected from feature points associated with each of said multiple template images, wherein an invariant feature point is a feature point that is present in at least a predetermined number of template images; and
   (D) associating said composite set of feature points with said particular template image,
   wherein said determining in (C) comprises:
   (C)(1) determining that feature points from distinct images of said multiple template images are similar using distance measures in Euclidean space and feature descriptor space.

2. The method of claim 1 wherein said determining is (C) also determines said composite set of feature points from feature points associated with said particular template image.

3. The method of claim 1 wherein said composite set of feature points comprises invariant feature points selected from: (i) feature points associated with each of said multiple template images, and (ii) feature points associated with said particular template image.

4. The method of claim 1 wherein said each of said multiple transformations comprises one or more transformations selected from: scaling, blurring, stretching, rotating, skewing, translating, distorting, contrast adjusting, color adjusting, morphological filtering, and projective transformations.

5. The method of claim 1 further comprising:
   (E) using said composite set of feature points associated with said particular template image to determine whether at least a portion of said particular template image is present in a test image.

6. The method of claim 5 further comprising:

(F) based on said determining in (E), when it is determined using said composite set of feature points that said at least a portion of said particular template image is present in a test image, verifying that said at least a portion of said particular template image is present in a test image using said feature points associated with said particular template image.

7. An article of manufacture, comprising non-transitory computer-readable media having computer readable instructions stored thereon, the computer readable instructions including instructions for implementing a computer-implemented method, said method operable on one or more devices comprising hardware including memory and at least one processor and running one or more services on said hardware, said method comprising:

(A) producing multiple template images from a particular template image, said multiple template images being produced by multiple transformations of said particular template image;

(B) for each of said multiple template images and for said particular template image determining a corresponding set of feature points;

(C) determining a composite set of feature points from feature points associated with each of said multiple template images, said composite set of feature points comprising invariant feature points selected from feature points associated with each of said multiple template images, wherein an invariant feature point is a feature point that is present in at least a predetermined number of template images; and (D) associating said composite set of feature points with said particular template image, wherein said determining in (C) comprises:

(C)(1) determining that feature points from distinct images of said multiple template images are similar using distance measures in Euclidean space and feature descriptor space.

8. The article of manufacture of claim 7 wherein said determining is (C) also determines said composite set of feature points from feature points associated with said particular template image.

9. The article of manufacture of claim 7 wherein said composite set of feature points comprises invariant feature points selected from: (i) feature points associated with each of said multiple template images, and (ii) feature points associated with said particular template image.

10. The article of manufacture of claim 7 wherein said each of said multiple transformations comprises one or more transformations selected from: scaling, blurring, stretching, rotating, skewing, translating, distorting, contrast adjusting, color adjusting, morphological filtering, and projective transformations.

11. The article of manufacture of claim 7 wherein the method further comprises:

(E) using said composite set of feature points associated with said particular template image to determine whether at least a portion of said particular template image is present in a test image.

12. The article of manufacture of claim 7 wherein the method further comprises:

(F) based on said determining in (E), when it is determined using said composite set of feature points that said at least a portion of said particular template image is present in a test image, verifying that said at least a portion of said particular template image is present in a test image using said feature points associated with said particular template image.

* * * * *